United States Patent
Inoue

(10) Patent No.: US 11,110,871 B2
(45) Date of Patent: Sep. 7, 2021

(54) COMMUNICATION APPARATUS, COMMUNICATION SYSTEM, AND COMPUTER PROGRAM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Masayuki Inoue, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 143 days.

(21) Appl. No.: 16/474,279

(22) PCT Filed: Jan. 4, 2018

(86) PCT No.: PCT/JP2018/000017
§ 371 (c)(1),
(2) Date: Jun. 27, 2019

(87) PCT Pub. No.: WO2018/135305
PCT Pub. Date: Jul. 26, 2018

(65) Prior Publication Data
US 2019/0351844 A1 Nov. 21, 2019

(30) Foreign Application Priority Data
Jan. 18, 2017 (JP) .............................. JP2017-006778

(51) Int. Cl.
*B60R 16/023* (2006.01)
*H04L 12/40* (2006.01)

(52) U.S. Cl.
CPC ............ *B60R 16/023* (2013.01); *H04L 12/40* (2013.01); *H04L 2012/40215* (2013.01); *H04L 2012/40273* (2013.01)

(58) Field of Classification Search
CPC ................... B60R 16/023; H04L 12/40; H04L 2012/40215; H04L 2012/40273; G06F 13/00
See application file for complete search history.

(56) References Cited

U.S. PATENT DOCUMENTS

| | | | | |
|---|---|---|---|---|
| 5,600,634 A | * | 2/1997 | Satoh | H04L 12/403 370/294 |
| 5,684,343 A | * | 11/1997 | Riley | H04J 3/14 307/127 |

(Continued)

FOREIGN PATENT DOCUMENTS

JP 2003191804 * 9/2003 ............. B60R 16/02

*Primary Examiner* — Richard M Camby
(74) *Attorney, Agent, or Firm* — Honigman LLP

(57) ABSTRACT

An ECU compares a plurality of pieces of data that include the same identification information if they are received within a preset time range. If it is determined, as a result of the comparison, that there are one or more data groups each consisting of data having the same content, and the number of largest data groups with the largest number of pieces of data among the one or more data groups is one, the ECU selects data included in the largest data group as proper data. In the ECU, if it is determined that, as a result of comparison, that there is no data group, or the number of largest data groups is greater than one, the contents of the plurality of pieces of data received within the time range are ignored.

10 Claims, 7 Drawing Sheets

(56) References Cited

U.S. PATENT DOCUMENTS

| | | |
|---|---|---|
| 9,880,929 B2 * | 1/2018 | Roesch ............... G06F 12/0246 |
| 10,896,347 B2 * | 1/2021 | Yamato ................ G06F 16/907 |
| 2003/0076221 A1 | 4/2003 | Akiyama et al. |
| 2004/0057450 A1 * | 3/2004 | Okuyama ............ H04L 67/325 |
| | | 370/447 |
| 2008/0101394 A1 * | 5/2008 | Noumi ................ H04L 12/4135 |
| | | 370/401 |
| 2008/0273527 A1 | 11/2008 | Short et al. |
| 2015/0358351 A1 | 12/2015 | Otsuka et al. |
| 2017/0070989 A1 | 3/2017 | Morel-Fourrier et al. |

* cited by examiner

| Identification information | Usage | Apparatus that executes processing |
|---|---|---|
| B1 | Aperiodic transmission perfomed by ECU 1 | ECU2 |
| C1 | Periodical transmission perfomed by ECU 1 | ECU3 |
| C2 | Periodical transmission perfomed by ECU 2 | ECU1 |
| B3 | Aperiodic transmission perfomed by ECU 3 | ECU1 |

ECU1

| Identification information | Frequency information | Range information |
|---|---|---|
| C1 | N1 | — |
| C2 | — | R1 |

ECU2

| Identification information | Frequency information | Range information |
|---|---|---|
| C2 | N2 | — |

ECU3

| Identification information | Frequency information | Range information |
|---|---|---|
| C1 | — | R3 |

COMMUNICATION APPARATUS, COMMUNICATION SYSTEM, AND COMPUTER PROGRAM

CROSS-REFERENCE TO RELATED APPLICATIONS

This application is the U.S. national stage of PCT/JP2018/000017 filed on Jan. 4, 2018, which claims priority of Japanese Patent Application No. JP 2017-006778 filed on Jan. 18, 2017, the contents of which are incorporated herein.

TECHNICAL FIELD

The present disclosure relates to a communication apparatus that receives data that includes identification information, a communication system provided with the communication apparatus, and a computer program for causing a computer to execute data processing.

BACKGROUND

Examples of a communication system installed in a vehicle include a communication system in which a plurality of ECUs (electronic control units) communicate with each other via a communication line (for example, see JP 2014-146868A). In this communication system, each of the ECUs functions as a communication apparatus, and executes processing related to data received via the communication line. Electric devices are respectively connected to the ECUs. One ECU controls operations of the electric device connected thereto, based on data received via the communication line, as the processing related to the data.

In the communication system described in JP 2014-146868A, each piece of data transmitted via a communication line includes identification information. The identification information is information for identifying the data that contains this identification information. Data transmitted by one of the ECUs is received by all the other ECUs excluding this ECU. The ECUs include an ECU that periodically transmits data that includes specific identification information. The ECUs include a specific ECU that, if data that includes the specific identification information is received, executes processing related to this data.

If an improper communication apparatus, which is improperly connected to the communication line, transmits improper data that includes specific identification information, there is a risk that the specific ECU erroneously executes processing related to the improper data. In the communication system described in JP 2014-146868A, the specific ECU calculates, from reference data, a period until target data, which is to be determined to be normal data or not, is received. The specific ECU periodically receives data that includes specific identification information. The target data is a currently received piece of data from among pieces of data that include identification information, and the reference data is a previously received piece of data.

If the calculated period is shorter than one cycle, the specific ECU monitors whether or not data that includes the specific identification information will be received repeatedly until one cycle elapses since the reference data was received. When the specific ECU receives data that includes the specific identification information repeatedly, there is a possibility that one of the repeatedly received data and the target data is improper data. Therefore, the specific ECU determines whether or not the repeatedly received data and the target data resemble each other. If it is determined that the repeatedly received data and the target data resemble each other, the specific ECU determines that improper data has not been received, and executes processing related to the target data. If the repeatedly received data and the target data do not resemble each other, it is highly likely that one of the repeatedly received data and the target data is improper data. Therefore, if it is determined that the repeatedly received data and the target data do not resemble each other, the specific ECU discards the repeatedly received data and the target data, and the communication system stops operating. Accordingly, the specific ECU is prevented from executing erroneous processing related to the improper data.

However, the communication system described in JP 2014-146868A has a problem in that, if it is detected that improper data has been transmitted, the plurality of ECUs and electric devices respectively connected to the ECUs stop operating.

The present disclosure has been made in light of the above-described problem, and aims to provide a communication apparatus, a communication system, and a computer program that allow processing related to proper data to be repeatedly performed even if improper data is transmitted.

SUMMARY

A communication apparatus according to the present disclosure receives data that includes identification information, and includes a comparison unit that compares a plurality of pieces of data that include the same identification information if they are received within a preset time range, and a selection unit that selects the data included in the largest data group if it is determined, as a result of the comparison unit comparing the plurality of pieces of data, that there are one or more data groups each consisting of data having the same content, and the number of largest data groups with the largest number of pieces of data among the one or more data groups is one, and if it is determined, as a result of the comparison unit comparing the plurality of pieces of data, that there is no such data group or the number of largest data groups is greater than one, contents of the plurality of pieces of data are ignored.

In the communication apparatus according to the present disclosure, the same identification information is identification information included in periodically transmitted data.

The communication apparatus according to the present disclosure includes a range change unit that changes the time range based on a time point at which data that includes the same identification information was received.

In the communication apparatus according to the present disclosure, a content of data that includes the same identification information, and was received outside of the time range is also ignored.

A communication system according to the present disclosure includes the above-described communication apparatus and a transmission apparatus that transmits data that includes the same identification information to the communication apparatus, and the transmission apparatus includes a repeated transmission unit that repeatedly transmits data that includes the same identification information and has the same content, if it is determined, as a result of the comparison unit of the communication apparatus comparing the plurality of pieces of data, that there is no such data group.

In the communication system according to the present disclosure, the communication apparatus includes a data number change unit that, if it is determined, as a result of the comparison unit comparing the plurality of pieces of data, that the number of largest data groups is greater than one, changes the number of pieces of data that are repeatedly transmitted by the transmission apparatus to a number larger than the number of pieces of data in the largest data group.

In the communication system according to the present disclosure, the transmission apparatus includes a stop unit that, if it is determined, as a result of the comparison unit of the communication apparatus comparing the plurality of pieces of data, that all of the plurality of pieces of data have the same content, stops repeated transmission of the data that includes the same identification information and has the same content.

A computer program according to the present disclosure causes a computer to execute the steps of comparing a plurality of pieces of data that include the same identification information if they are received within a preset time range, and selecting the data included in the largest data group, if it is determined, as a result of comparing the plurality of pieces of data, that there are one or more data groups each consisting of data having the same content, and the number of largest data groups with the largest number of pieces of data among the one or more data groups is one.

In the communication apparatus and the computer program according to the present disclosure, if improper data is transmitted and accordingly a plurality of pieces of data that include the same identification information are received within a time range, the plurality of pieces of data are compared. For example, if it is determined, as a result of comparing the plurality of pieces of data, that there is no data group consisting of data having the same content, the apparatus that transmits proper data that includes the same identification information is caused to repeatedly transmit data having the same content. For example, if it is determined, as a result of comparing a plurality of pieces of data, that the number of largest data groups with the largest number of pieces of data is greater than one, the number of pieces of data that are repeatedly transmitted by the apparatus that transmits proper data that includes the same identification information is increased.

When there is no data group, and the apparatus that transmits data is caused to repeatedly transmit data having the same content, the number of data groups changes from zero to one. At this time, the largest data group consists of a plurality of pieces of proper data. When the number of largest data groups is greater than one, and the number of pieces of data that are repeatedly transmitted by the apparatus that transmits data is increased, the number of largest data groups changes to one. At this time, this largest data group consists of a plurality of pieces of proper data. As a result, proper data is selected from the next reception of data that includes the same identification information, and processing related to the proper data is repeatedly performed.

In the communication apparatus according to the present disclosure, data that includes the same identification information is received. Here, the same identification information is one piece of identification information or one of a plurality of pieces of identification information included in data that is periodically transmitted.

In the communication apparatus according to the present disclosure, the time range is changed to an appropriate time range for receiving data that includes the same identification information for the next time, based on a time point at which data that includes the same identification information was received.

In the communication apparatus according to the present disclosure, data that includes the same identification information from among data received outside of the time range is designated as improper data, and the content of this data is ignored.

In the communication system according to the present disclosure, if it is determined, as a result of comparing a plurality of pieces of data in the communication apparatus, that there is no data group, the transmission apparatus repeatedly transmits data that includes the same identification information and has the same content. Accordingly, in the communication apparatus, proper data transmitted by the transmission apparatus is reliably selected.

In the communication system according to the present disclosure, when the transmission apparatus repeatedly transmits data that includes the same identification information and has the same content, and the number of largest data groups is greater than one, the number of pieces of data that are repeatedly transmitted by the transmission apparatus is changed to a number larger than the number of pieces of data in the largest data groups. Therefore, even if the number of pieces of improper data that are received within the time range increases, and the number of largest data groups changes to greater than one, proper data transmitted by the transmission apparatus is selected in the communication apparatus.

In the communication system according to the present disclosure, if it is determined, as a result of comparing a plurality of pieces of data, in the communication apparatus, that all of the plurality of pieces of data have the same content, the transmission apparatus stops repeated transmission of the data that includes the same identification information and has the same content. Therefore, the transmission apparatus transmits a piece of data at a timing when data that includes the same identification information needs to be transmitted. Therefore, regarding data that includes the same identification information, the loads of processes performed by the communication apparatus and the transmission apparatus are small.

Advantageous Effects of Disclosure

According to the present disclosure, even if improper data is transmitted, processing related to proper data is repeatedly performed.

DETAILED DESCRIPTION OF PREFERRED EMBODIMENTS

The present disclosure will be described below in detail with reference to the drawings illustrating embodiments thereof.

Figures 1, 2:
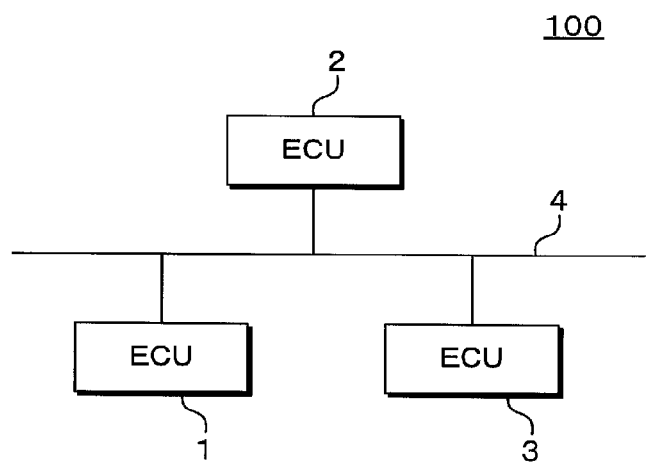
FIG. 1 is a block diagram showing the main constituent elements of a communication system in an embodiment of the present disclosure.
FIG. 2 is a diagram illustrating usages of identification information.

FIG. 1 is a block diagram showing the main constituent elements of a communication system 100 in this embodiment. The communication system 100 is favorably installed in a vehicle, and is provided with three ECUs 1 to 3 and a communication line 4. The ECUs 1 to 3 are individually connected to the communication line 4.

Electric devices (not illustrated) are respectively connected to the ECUs 1 to 3. The ECUs 1 to 3 output a control signal indicating the content of an operation to the respective electric devices to which the ECUs 1 to 3 are connected. The electric devices operate in accordance with the content indicated by the control signal that has been input.

Each of the ECUs 1 to 3 transmits data via the communication line 4. Data transmitted by one of the ECUs 1 to 3 is received by all the other ECUs. For example, data transmitted by the ECU 1 is received by the ECUs 2 and 3.

Each of the ECUs 1 to 3 executes processing related to data received via the communication line 4. For example, assume that the ECU 3 has a function for adjusting the light intensity of the headlights of the vehicle, and an external signal indicating the brightness outside of the vehicle is input to the ECU 1. The ECU 1 periodically transmits data indicating the brightness outside of the vehicle via the communication line 4. The ECU 3 periodically adjusts the light intensity of headlights in accordance with the brightness indicated by the data received from the ECU 1.

The ECUs 1 to 3 perform communication in compliance with the CAN (controller area network) protocol. The communication line 4 is a twisted pair line.

The ECU 1 transmits data that includes identification information B1 or identification information C1. The ECU 2 transmits data that includes identification information C2. The ECU 3 transmits data that includes identification information B3. These pieces of identification information B1, C1, C2, and B3 are information for identifying data that includes them, respectively.

FIG. 2 is a diagram illustrating usages of the respective pieces of identification information B1, C1, C2, and B3. The ECU 1 aperiodically (sporadically) transmits data that includes the identification information B1. Therefore, the data that includes the identification information B1 is aperiodically transmitted. The apparatus that executes processing related to data that includes the identification information B1 is the ECU 2. The ECU 1 periodically transmits data that includes the identification information C1. The apparatus that executes processing related to data that includes the identification information C1 is the ECU 3.

The ECU 2 periodically transmits data that includes the identification information C2. The apparatus that executes processing related to data that includes the identification information C2 is the ECU 1. The ECU 3 aperiodically transmits data that includes the identification information B3. The apparatus that executes processing related to data that includes the identification information B3 is the ECU 1. The pieces of identification information C1 and C2 correspond to "same identification information".

Hereinafter, periodically transmitted data is referred to as cyclic data, and aperiodically transmitted data is referred to as aperiodic data.

The ECU 2 is not the apparatus that executes processing related to aperiodic data that includes the identification information B3. Therefore, if it receives aperiodic data that includes the identification information B3, the ECU 2 does not execute processing related to the received aperiodic data, and ignores the content of the received aperiodic data. The ECU 2 is not the apparatus that executes processing related to cyclic data that includes the identification information C1. Therefore, if it receives cyclic data that includes the identification information C1, the ECU 2 does not execute processing related to the received cyclic data, and ignores the content of the received cyclic data. The ECU 3 is not the apparatus that executes processing related to aperiodic data that includes the identification information B1. Therefore, it receives if aperiodic data that includes the identification information B1, the ECU 3 does not execute processing related to the received aperiodic data, and ignores the content of the received aperiodic data. The ECU 3 is not the apparatus that executes processing related to cyclic data that includes the identification information C2. Therefore, if it receives cyclic data that includes the identification information C2, the ECU 3 does not execute processing related to the received cyclic data, and ignores the content of the received cyclic data.

Figures 3, 4:
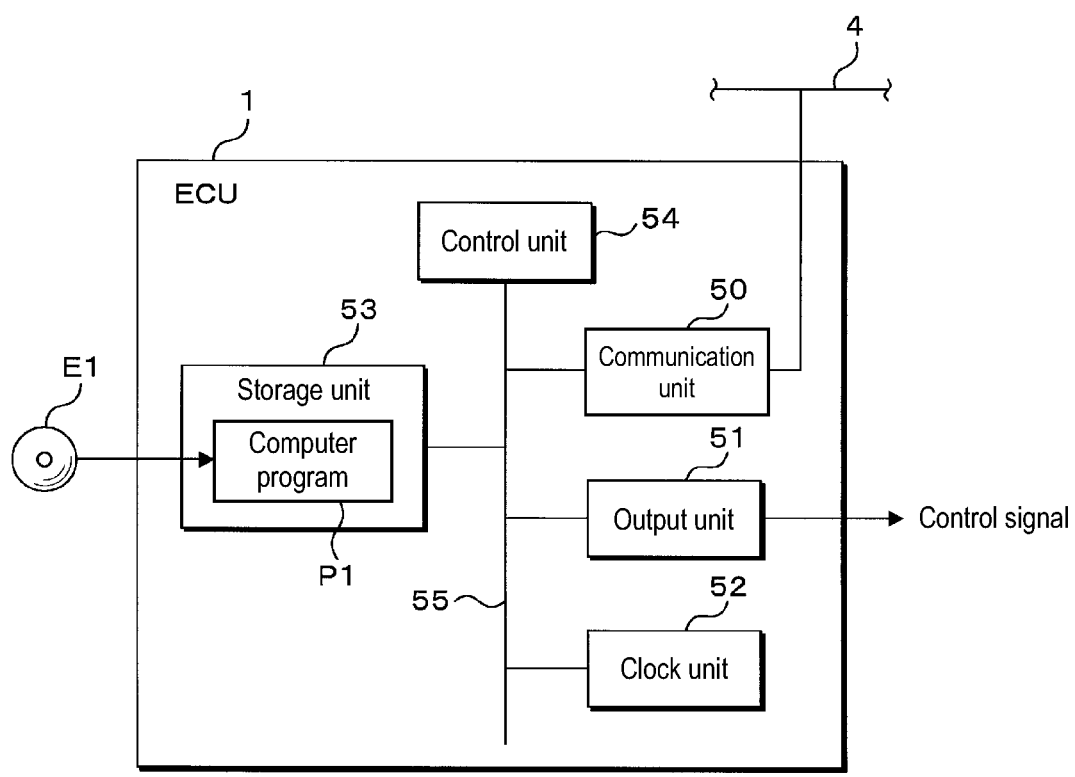
FIG. 3 is a block diagram showing the main constituent elements of an ECU.
FIG. 4 is a diagram showing information stored in a storage unit of the ECU.

FIG. 3 is a block diagram showing the main constituent elements of the ECU 1. The ECU 1 has a communication unit 50, an output unit 51, a clock unit 52, a storage unit 53, and a control unit 54. These are individually connected to a bus 55. The communication unit 50 is connected to the communication line 4 in addition to the bus 55. The output unit 51 is connected to an electric device (not illustrated) corresponding to the ECU 1.

The communication unit 50 transmits aperiodic data that includes the identification information B1 and cyclic data that includes the identification information C1 via the communication line 4 in accordance with an instruction of the control unit 54. In addition, the communication unit 50 receives aperiodic data and cyclic data transmitted via the communication line 4.

When transmitting aperiodic data or cyclic data, the communication unit 50 performs arbitration to prevent a plurality of pieces of data from being transmitted at the same time. Therefore, the communication unit 50 does not necessarily transmit data immediately after the control unit 54 instructs data transmission.

The output unit 51 outputs a control signal to the electric device corresponding to the ECU 1, in accordance with an instruction of the control unit 54. The electric device operates in accordance with the content indicated by the control signal that has been input from the output unit 51.

The control unit 54 acquires time information indicating a time from the clock unit 52. The time indicated by the time information acquired by the control unit 54 from the clock unit 52 substantially matches the time point of the acquisition.

The storage unit 53 is a nonvolatile memory, for example. The storage unit 53 stores a computer program P1. The control unit 54 has a CPU (central processing unit, not illustrated). The CPU of the control unit 54 executes cyclic transmission processing, aperiodic transmission processing, cyclic reception processing, and aperiodic reception processing by executing the computer program P1. The computer program P1 is used for the control unit 54 to execute the above processing.

The cyclic transmission processing is processing related to transmission of cyclic data that includes the identification information C1. The aperiodic transmission processing is processing related to transmission of aperiodic data that includes the identification information B1. The cyclic reception processing is processing related to reception of cyclic data that includes the identification information C2. The aperiodic reception processing is processing related to reception of aperiodic data that includes the identification information B3.

Note that the computer program P1 may be stored in a storage medium E1 in a computer-readable manner. In this case, the computer program P1 read out from the storage medium E1 by a readout apparatus (not illustrated) is stored in the storage unit 53. The storage medium E1 is an optical disk, a flexible disk, a magnetic disk, a magnetic optical disk, a semiconductor memory, or the like.

The optical disk is a CD (compact disc)-ROM (read only memory), a DVD (digital versatile disc)-ROM, a BD (blu-ray (registered trademark) disc), or the like. The magnetic disk is a hard disk, for example. In addition, a configuration may also be adopted in which the computer program P1 is downloaded from an external apparatus (not illustrated) connected to a communication network (not illustrated), and the downloaded computer program P1 is stored to the storage unit 53.

FIG. 4 is a table showing information stored in the storage unit 53 of the ECU 1. In the ECU 1, there are cases where the control unit 54 repeatedly instructs the communication unit 50 to transmit cyclic data that includes the identification information C1. The storage unit 53 stores frequency information N1 indicating the number of times of repeated transmission, in other words the number of times the cyclic data that includes the identification information C1 needs to be repeatedly transmitted, and range information R1 indicating a time range of cyclic data that includes the identification information C2. Therefore, in the storage unit 53, the time range of the cyclic data that includes the identification information C2 is set in advance. Specifically, the range information R1 indicates a start time and an end time of the time range. The number of times of repeated transmission indicated by the frequency information N1 and the time range indicated by the range information R1 are changed by the control unit 54.

Each of the ECUs 2 and 3 is configured similar to the ECU 1, and has a communication unit 50, an output unit 51, a clock unit 52, a storage unit 53 and a control unit 54. Effects of the constituent elements of the ECUs 2 and 3 that are different from the effects of the constituent elements of the ECU 1 will be described below.

The communication unit 50 of the ECU 2 transmits cyclic data that includes the identification information C2 via the communication line 4 in accordance with an instruction of the control unit 54. The communication unit 50 of the ECU 3 transmits aperiodic data that includes the identification information B3 via the communication line 4 in accordance with an instruction of the control unit 54.

The output units 51 of the ECUs 2 and 3 output a control signal to the electric devices corresponding to the ECUs 2 and 3 in accordance with an instruction of the control unit 54.

In the ECU 2, the CPU of the control unit 54 executes the cyclic transmission processing and aperiodic reception processing by executing the computer program P1 stored in the storage unit 53. The computer program P1 stored in the storage unit 53 of the ECU 2 is used for the CPU of the control unit 54 of the ECU 2 to execute the above processing.

In the ECU 3, the CPU of the control unit 54 executes the aperiodic transmission processing and cyclic reception processing by executing the computer program P1 stored in the storage unit 53. The computer program P1 stored in the storage unit 53 of the ECU 3 is used for the CPU of the control unit 54 of the ECU 3 to execute the above processing.

The cyclic transmission processing that is executed by the control unit 54 of the ECU 2 is processing related to transmission of cyclic data that includes the identification information C2. The aperiodic reception processing that is executed by the control unit 54 of the ECU 2 is processing related to reception of aperiodic data that includes the identification information B1.

The aperiodic transmission processing that is executed by the control unit 54 of the ECU 3 is processing related to transmission of aperiodic data that includes the identification information B3. The cyclic reception processing that is executed by the control unit 54 of the ECU 3 is processing related to reception of cyclic data that includes the identification information C1.

Figures 5, 6:
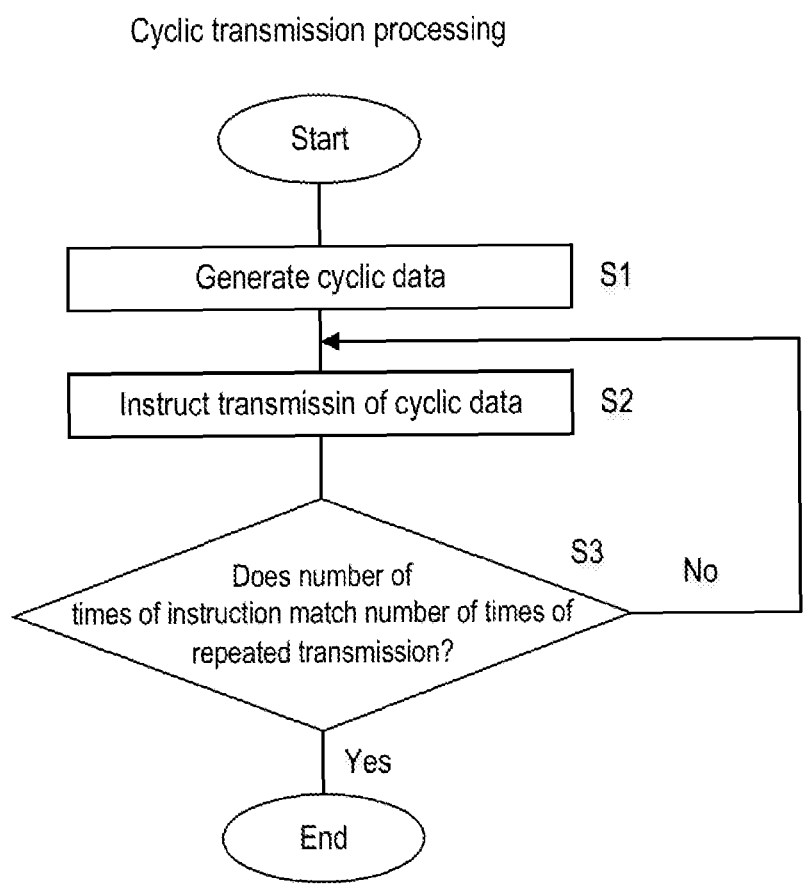
FIG. 5 is a diagram showing information stored in storage units of ECUs.
FIG. 6 is a flowchart showing a procedure of cyclic transmission processing.

FIG. 5 shows tables of information stored in the storage units 53 of the ECUs 2 and 3. In the ECU 2, there are cases where the control unit 54 repeatedly instructs the communication unit 50 to transmit cyclic data that includes the identification information C2. The storage unit 53 of the ECU 2 stores frequency information N2 indicating the number of times of repeated transmission of the cyclic data that includes the identification information C2. The number of times of repeated transmission indicated by the frequency information N2 is changed by the control unit 54 of the ECU 2.

The storage unit 53 of the ECU 3 stores range information R3 indicating the time range of cyclic data that includes the identification information C1. Therefore, in the storage unit 53 of the ECU 3, the time range of the cyclic data that includes the identification information C1 is set in advance. The range information R3 indicates a start time and an end time of the time range similarly to the range information R1. The time range indicated by the range information R3 is changed by the control unit 54 of the ECU 3.

Aperiodic data that includes the identification information B1 includes aperiodic data indicating the number of times of repeated transmission of the cyclic data that includes the identification information C2. Similarly, aperiodic data that includes the identification information B3 includes aperiodic data indicating the number of times of repeated transmission of the cyclic data that includes the identification information C1.

FIG. 6 is a flowchart showing a procedure of the cyclic transmission processing. Here, the cyclic transmission processing that is executed by the control unit 54 of the ECU 1 will be described. The control unit 54 of the ECU 1 executes the cyclic transmission processing in a predetermined cycle. First, the control unit 54 generates cyclic data that includes the identification information C1 (step S1). If a vehicle speed sensor that detects a vehicle speed is connected to the ECU 1, the control unit 54 generates, in step S1, cyclic data indicating the vehicle speed detected by the vehicle speed sensor, for example.

Next, the control unit 54 instructs the communication unit 50 to transmit the cyclic data generated in step S1 (step S2). The communication unit 50 transmits the cyclic data generated by the control unit 54 in step S1.

After executing step S2, the control unit 54 executes the cyclic transmission processing, and then determines whether or not the number of times it was instructed to transmit cyclic data matches the number of times of repeated transmission indicated by the frequency information N1 (step S3).

If it is determined that the number of times of the instruction does not match the number of times of repeated transmission, in other words the number of times of the instructions is smaller than the number of times of repeated transmission (step S3: NO), the control unit 54 executes step S2, and transmits the cyclic data generated in step S1 again. Until the number of times of the instruction reaches the number of times of repeated transmission, step S2 is repeatedly executed. Accordingly, the communication unit 50 repeatedly transmits cyclic data having the same content. The number of times the cyclic data is repeatedly transmitted matches the number of times of repeated transmission stored in the storage unit 53.

If it is determined that the number of times of the instruction matches the number of times of repeated transmission (step S3: YES), the control unit 54 ends the cyclic transmission processing.

Note that if the number of times of repeated transmission of the identification information C1 stored in the storage unit 53 is one, the number of pieces of cyclic data transmitted by the communication unit 50 in the cyclic transmission processing is one.

The cyclic transmission processing that is executed by the control unit 54 of the ECU 2 is similar to the cyclic transmission processing that is executed by the control unit 54 of the ECU 1. By respectively replacing the ECU 1, the identification information C1, and the frequency information N1 in the description regarding the cyclic transmission processing of the ECU 1 with the ECU 2, the identification information C2, and the frequency information N2, description regarding the cyclic transmission processing of the ECU 2 can be achieved.

The control unit 54 of the ECU 1 executes the aperiodic transmission processing at a timing when aperiodic data needs to be transmitted. For example, if an antenna for receiving a wireless signal is connected to the ECU 1, when the antenna receives a wireless signal for instructing to lock or unlock the doors of the vehicle, the control unit 54 executes the aperiodic transmission processing. In the aperiodic transmission processing, the control unit 54 transmits aperiodic data that includes the identification information B1. With this aperiodic data, it is instructed to lock or unlock the doors of the vehicle. After transmitting the aperiodic data, the control unit 54 ends the aperiodic transmission processing.

There are cases where the communication unit 50 of the ECU 2 repeatedly transmits cyclic data that includes the identification information C2. In order to change the number of times of repeated transmission of the cyclic data that includes the identification information C2, the control unit 54 of the ECU 1 causes the communication unit 50 to transmit aperiodic data indicating the number of times of repeated transmission of the cyclic data, in the cyclic reception processing. This aperiodic data includes the identification information B1.

At a timing when aperiodic data needs to be transmitted, the control unit 54 of the ECU 3 executes the aperiodic transmission processing similarly to the control unit 54 of the ECU 1. In the aperiodic transmission processing, the control unit 54 transmits aperiodic data that includes the identification information B3. After transmitting the aperiodic data, the control unit 54 ends the aperiodic transmission processing. There are cases where the communication unit 50 of the ECU 1 repeatedly transmits cyclic data that includes the identification information C1. In order to change the number of times of repeated transmission of the cyclic data that includes the identification information C1, the control unit 54 of the ECU 3 causes the communication unit 50 to transmit aperiodic data indicating the number of times of repeated transmission of the cyclic data, in the cyclic reception processing. This aperiodic data includes the identification information B3.

Figure 7:
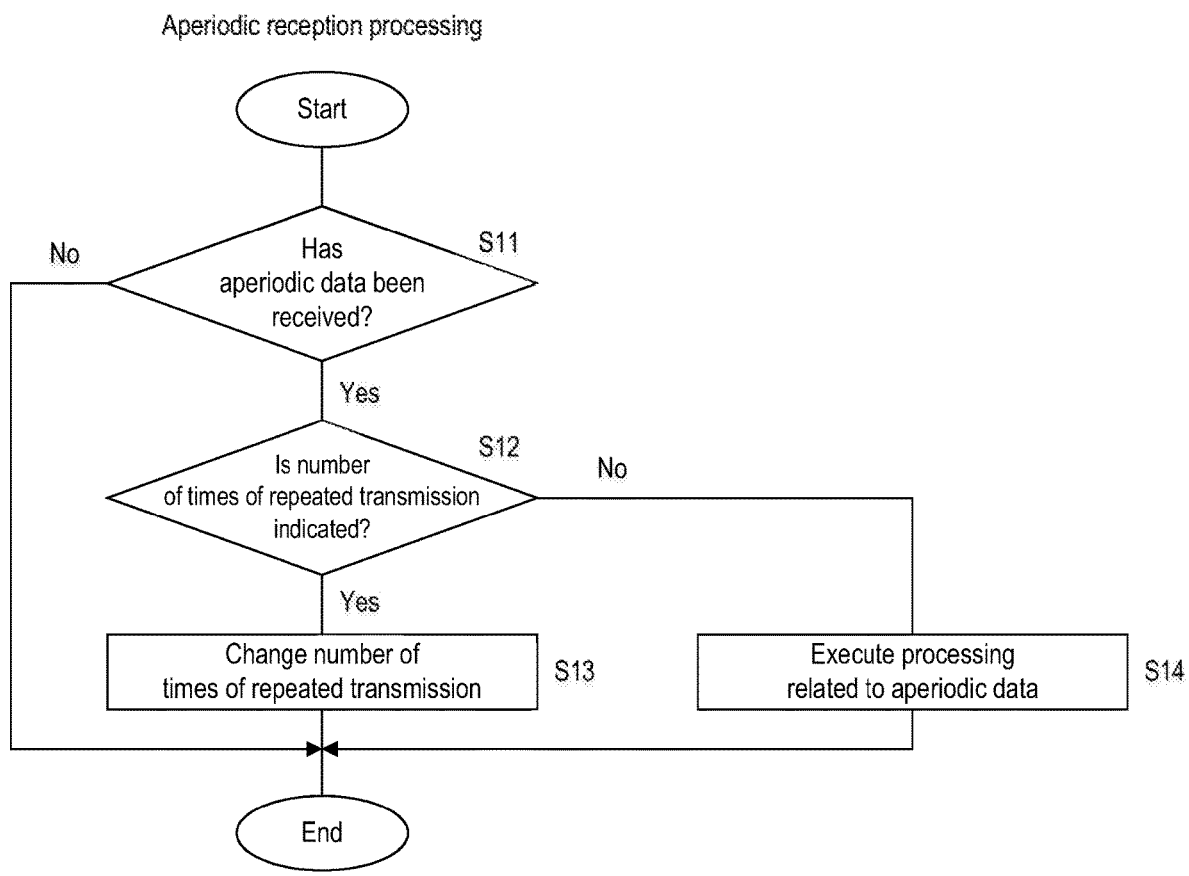
FIG. 7 is a flowchart showing a procedure of aperiodic reception processing.

FIG. 7 is a flowchart showing a procedure of the aperiodic reception processing. Here, the aperiodic reception processing that is executed by the control unit 54 of the ECU 1 will be described. The control unit 54 of the ECU 1 periodically executes the aperiodic reception processing. First, in the ECU 1, the control unit 54 determines whether or not the communication unit 50 has received aperiodic data that includes the identification information B3, via the communication line 4 (step S11). If it is determined that the communication unit 50 has received the aperiodic data (step S11: YES), the control unit 54 determines whether or not the aperiodic data received by the communication unit 50 indicates the number of times of repeated transmission (step S12).

If it is determined that the aperiodic data indicates the number of times of repeated transmission (step S12: YES), the control unit 54 changes the number of times of repeated transmission indicated by the frequency information N1, in other words the number of times of repeated transmission of cyclic data that includes the identification information C1 to the number of times of repeated transmission indicated by the aperiodic data received by the communication unit 50 (step S13). Since the aperiodic data that includes the identification information B3 was transmitted from the ECU 3, the number of times of repeated transmission of the cyclic data that includes the identification information C1 is changed by the ECU 3.

If it is determined that the aperiodic data does not indicate the number of times of repeated transmission (step S12: NO), the control unit 54 executes processing related to the aperiodic data received by the communication unit 50 (step S14). For example, if the electric device connected to the ECU 1 is a motor for opening/closing the powered windows, when aperiodic data for instructing to open the powered windows is received by the communication unit 50, the control unit 54 outputs a control signal for instructing to open the powered windows to the electric device. Accordingly, the powered windows are opened by the electric device.

If it is determined that the communication unit 50 has not received any aperiodic data that includes the identification information B3 (step S11: NO), or when one of steps S13 and S14 has been executed, the control unit 54 ends the aperiodic reception processing.

The aperiodic reception processing that is executed by the control unit 54 of the ECU 2 is similar to the aperiodic reception processing that is executed by the ECU 1. The control unit 54 of the ECU 2 periodically execute the aperiodic reception processing. In the ECU 2, the control unit 54 determines whether or not the communication unit 50 has received aperiodic data that includes the identification information B1, via the communication line 4. If it is determined that the communication unit 50 has received the aperiodic data, the control unit 54 determines whether or not the aperiodic data received by the communication unit 50 indicates the number of times of repeated transmission.

If it is determined that the aperiodic data indicates the number of times of repeated transmission, the control unit 54 changes the number of times of repeated transmission indicated by the frequency information N2, in other words the number of times of repeated transmission of cyclic data that includes the identification information C2, to the number of times of repeated transmission indicated by the aperiodic data received by the communication unit 50. Since the aperiodic data that includes the identification information B1 was transmitted from the ECU 1, the ECU 1 changes the number of times of repeated transmission of the cyclic data that includes the identification information C2.

If it is determined that the aperiodic data does not indicate the number of times of repeated transmission, the control unit 54 executes processing related to the aperiodic data received by the communication unit 50. If it is determined that the communication unit 50 has not received aperiodic data that includes the identification information B3, the control unit 54 ends the aperiodic reception processing. Also, after changing the number of times of repeated transmission, or after executing the processing related to the aperiodic data, the control unit 54 ends the aperiodic reception processing.

Figure 8:
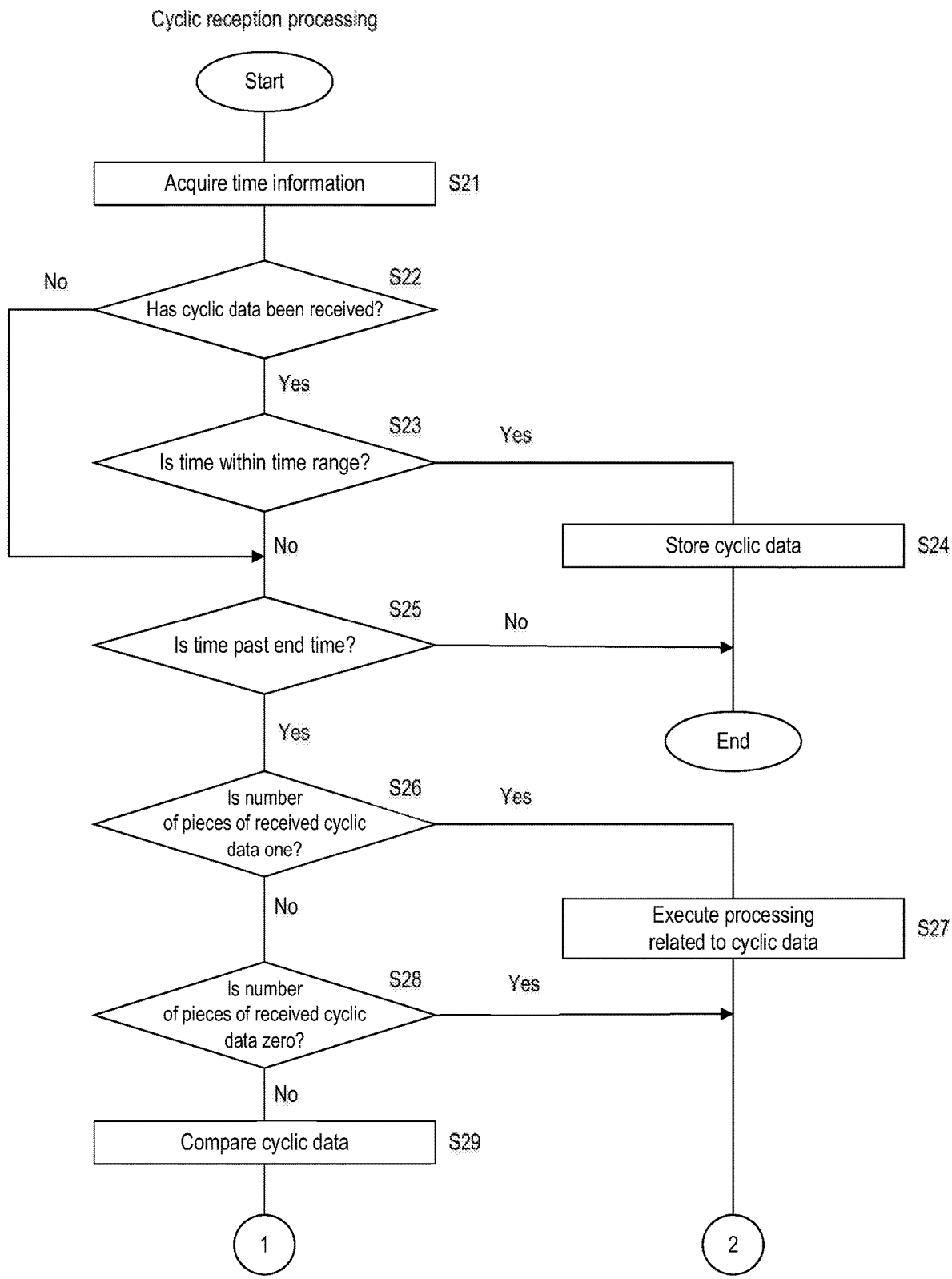
FIG. 8 is a flowchart showing a procedure of cyclic reception processing.
Figure 9:
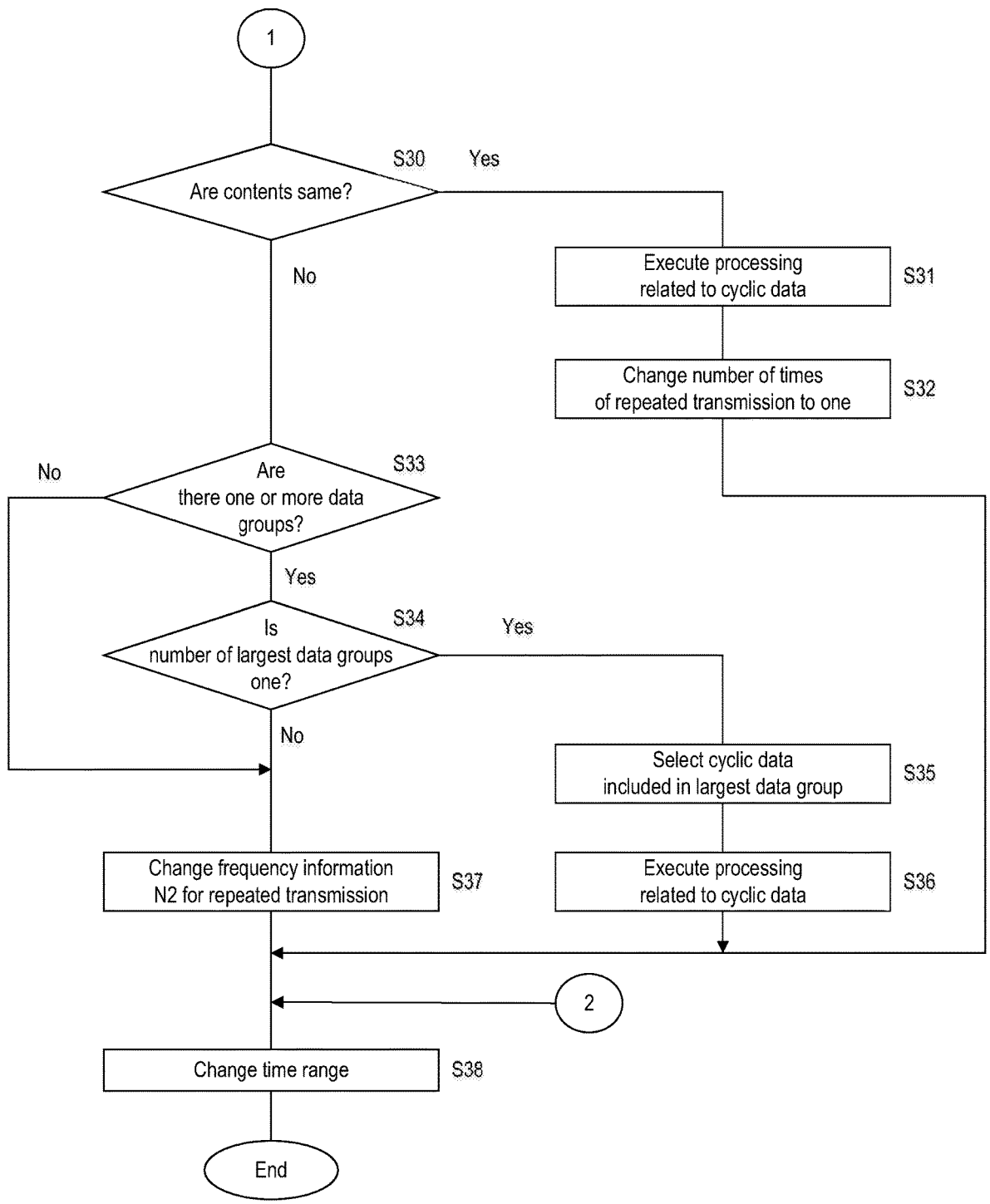
FIG. 9 is a flowchart showing a procedure of cyclic reception processing.

FIG. 8 and. 9 are flowcharts showing a procedure of the cyclic reception processing. Here, the cyclic reception processing that is executed by the control unit 54 of the ECU 1 will be described. The control unit 54 periodically executes the cyclic reception processing. First, the control unit 54 acquires time information from the clock unit 52 (step S21), and determines whether or not the communication unit 50 has received cyclic data that includes the identification information C2, via the communication line 4 (step S22). If it is determined that the communication unit 50 has received the cyclic data (step S22: YES), the control unit 54 determines whether or not the time indicated by the time information acquired in step S21 is within the time range indicated by the range information R1 (step S23).

If it is determined that the time is within the time range (step S23: YES), the control unit 54 stores the cyclic data received by the communication unit 50 to the storage unit 53 in association with the time indicated by the time information acquired in step S21 (step S24), and ends the cyclic reception processing.

If it is determined that the communication unit 50 has not received any cyclic data (step S22: NO), or if it is determined that the time is outside of the time range (step S23: NO), the control unit 54 determines whether or not the time indicated by the time information acquired in step S21 is past the end time of the time range indicated by the range information R1 (step S25). If it is determined that the time is not past the end time (step S25: NO), the control unit 54 ends the cyclic reception processing.

Accordingly, the cyclic data that was received by the communication unit 50 within the time range indicated by the range information R1 and includes the identification information C2 is stored to the storage unit 53.

If it is determined that the time is past the end time (step S25: YES), the control unit 54 determines whether or not the number of pieces of cyclic data received by the communication unit 50 within the time range that is set in the storage unit 53 in advance is one (step S26). This cyclic data is cyclic data that includes the identification information C2. If it is determined that the number of pieces of cyclic data received by the communication unit 50 is one (step S26: YES), the control unit 54 executes processing related to the cyclic data received by the communication unit 50 (step S27).

For example, assume that the cyclic data indicates whether or not it is raining, and the wiper motor of the vehicle is connected to the output unit 51 of the ECU 1. In this case, when the cyclic data received by the communication unit 50 indicates that it is raining, the control unit 54 instructs the output unit 51 to output a control signal indicating activation to the wiper motor of the vehicle in step S27, for example. Accordingly, the wiper motor of the vehicle is activated.

If it is determined that the number of pieces of cyclic data received by the communication unit 50 is not one (step S26: NO), the control unit 54 determines whether or not the number of pieces of cyclic data received by the communication unit 50 within the time range is zero (step S28). If it is determined that the number of pieces of cyclic data received by the communication unit 50 within the time range is not zero, in other words the communication unit 50 has received a plurality of pieces of cyclic data within the time range (step S28: NO), the control unit 54 compares the plurality of pieces of cyclic data received by the communication unit 50 (step S29). Specifically, the contents of the pieces of cyclic data, in other words the plurality of bit values constituting the cyclic data are compared. A bit value is a value represented as "1" or "zero". The control unit 54 functions as a comparison unit.

The control unit 54 determines whether or not all of the pieces of cyclic data received by the communication unit 50 have the same content (step S30). If it is determined that the contents are the same (step S30: YES), the control unit 54 executes processing related to one piece of cyclic data received by the communication unit 50 similarly to step S27 (step S31). Next, the control unit 54 informs the communication unit 50 of the number of times of repeated transmission, and causes the communication unit 50 to transmit aperiodic data that includes the identification information B1, so as to change, to one, the number of times of repeated transmission indicated by the frequency information N2, in other words the number of times of repeated transmission of the cyclic data that includes the identification information C2 (step S32). The number of times of repeated transmission indicated by the aperiodic data transmitted in step S32 is one. Accordingly, the communication unit 50 of the ECU 2 stops repeated transmission of the cyclic data that includes the identification information C2. The communication unit 50 of the ECU 2 functions as a stop unit.

Note that, in step S32, the communication unit 50 of the ECU 1 may transmit aperiodic data indicating that the contents of the plurality of pieces of cyclic data received by the communication unit 50 of the ECU 1 within the time range have the same content, in addition to the number of times of repeated transmission. Accordingly, the control unit 54 of the ECU 2 is notified of the reception state of the communication unit 50 of the ECU 1.

As described above, in the aperiodic reception processing of the ECU 2, if the communication unit 50 of the ECU 2 receives aperiodic data that includes the identification information B1, when this aperiodic data indicates the number of times of repeated transmission, the control unit 54 of the ECU 2 changes the number of times of repeated transmission indicated by the frequency information N2 to the number of times of repeated transmission indicated by the aperiodic data received by the communication unit 50.

If it is determined that all of the pieces of cyclic data received by the communication unit 50 do not have the same content (step S30: NO), the control unit 54 of the ECU 1 determines whether or not there are one or more data groups consisting of cyclic data having the same content (step S33).

If it is determined that there are one or more data groups (step S33: YES), the control unit 54 determines whether or not the number of largest data groups, in which the number of pieces of data is largest, among the one or more data groups, is one (step S34). For example, if the number of data groups is two, when the number of pieces of data in one of the data groups is two and the number of pieces of data in the other data group is three, the number of largest data groups is one. In a similar case, when the number of pieces of data of each of the two data groups is two, the number of largest data group is two. When the number of data groups is one, the number of largest data groups is one.

If it is determined that the number of largest data groups is one (step S34: YES), the control unit 54 selects one piece of cyclic data included in the largest data group (step S35), and executes processing related to the selected cyclic data similarly to step S27 or S31 (step S36). The control unit 54 also functions as a selection unit.

If it is determined that there is no data group or there are a plurality of data groups (step S33: NO), or if the number of largest data groups is not one (step S34: NO), the control unit 54 informs the communication unit 50 of the number of times of repeated transmission, and causes the communication unit 50 to transmit aperiodic data that includes the identification information B1, so as to change the number of times of repeated transmission indicated by the frequency information N2 (step S37). As described above, the number of times of repeated transmission indicated by the frequency information N2 is the number of times of repeated transmission of the cyclic data that includes the identification information C2.

If it is determined in step S33 that there is no data group, the number of times of repeated transmission indicated by the aperiodic data that is transmitted in step S37 is a number greater than or equal to two. Accordingly, the number of times of repeated transmission indicated by the frequency information N2 stored in the storage unit 53 of the ECU 2 is changed from one to a number greater than or equal to two. The communication unit 50 of the ECU 2 starts repeated transmission of the cyclic data that includes the identification information C2. The communication unit 50 of the ECU 2 functions as a repeated transmission unit.

If it is determined in step S34 that the number of largest data group is not one, in other words the number of largest data groups is greater than one, the number of times of repeated transmission indicated by the aperiodic data that is transmitted in step S37 is a number greater than the number of pieces of data in the largest data group. The number of times of repeated transmission is a value calculated by adding one to the number of pieces of data in the largest data group, for example. Accordingly, in the aperiodic reception processing that is executed by the control unit 54 of the ECU 2, the number of times of repeated transmission of the cyclic data that includes the identification information C2 is changed to a number that is larger than the number of pieces of data in the largest data groups. The control unit 54 also functions as a data number change unit.

Note that in step S37 that is performed if it was determined in step S33 that there is no data group, the communication unit 50 of the ECU 1 may transmit aperiodic data indicating that the communication unit 50 of the ECU 1 has received a plurality of pieces of data within the time range and there is no data group, in addition to the number of times of repeated transmission. Accordingly, the control unit 54 of the ECU 2 is notified of the reception state of the communication unit 50 of the ECU 1.

Similarly, in step S37 that is performed if it is determined in step S34 that the number of largest data groups is not one, the communication unit 50 of the ECU 1 may transmit aperiodic data indicating that the communication unit 50 of the ECU 1 has received a plurality of pieces of data within the time range, and the number of largest data groups is not one, in addition to the number of times of repeated transmission. Accordingly, the control unit 54 of the ECU 2 is notified of the reception state of the communication unit 50 of the ECU 1.

After executing one of steps S27, S32, S36, and S37, or if it is determined that the number of pieces of cyclic data received by the communication unit 50 is zero (step S28: YES), the control unit 54 changes the time range indicated by the range information R1 (step S38).

As described above, the control unit 54 of the ECU 2 periodically executes the cyclic transmission processing. Hereinafter, a predetermined cycle of this cyclic transmission processing is denoted by T. In addition, in the storage unit 53, the time (length) is set in advance. The setting time that is set in the storage unit 53 is denoted by $\Delta t$. The setting time $\Delta t$ is shorter than a time calculated by dividing the cycle T by two.

In step S38 that is executed after step S27, for example, the control unit 54 of the ECU 1 designates, as a reference time, a time when the cycle T has elapsed since a time when the communication unit 50 received cyclic data. In step S38 that is executed after it is determined in step S28 that the number of pieces of cyclic data is zero, for example, a time when the cycle T has elapsed since the average time of the start time and the end time of the time range indicated by the range information R1 is designated as a reference time. Note that the time is equivalent to the time point.

In step S38 that is executed after step S32, for example, the control unit 54 designate, as a reference time, a time when the cycle T has elapsed since the time when the communication unit 50 received cyclic data for the first time within the time range indicated by the range information R1. In step S38 that is executed after step S36, for example, the control unit 54 designates, as a reference time, a time when the cycle T has elapsed since the earliest time among times when cyclic data included in the largest data group was received. In step S38 that is executed after step S37, for example, a time when the cycle T has elapsed since the average time of times of reception of cyclic data received by the communication unit 50 is designated as a reference time.

In step S38, regarding the time range indicated by the range information R1, the control unit 54 changes the start time to a time earlier than the reference time by the setting time $\Delta t$, and changes the end time to a time when the setting time $\Delta t$ has elapsed since the reference time. In step S38 that is executed after step S37, proper cyclic data is unknown, and thus a configuration may also be adopted in which the control unit 54 sets the setting time $\Delta t$ to a time longer than a time that is currently set, and then changes the start time and the end time. As described above, the time range indicated by the range information R1 is changed to an appropriate time range for receiving the cyclic data that includes the identification information C2 for the next time, based on the time (time point) when the cyclic data that includes the identification information C2 was received. The control unit 54 functions as a range change unit.

After executing step S38, the control unit 54 ends the cyclic reception processing.

In the cyclic reception processing related to reception of cyclic data that includes the identification information C2, cyclic data that includes the identification information C2, and has been received outside of the time range indicated by the range information R1 is determined to be improper data, and is not stored in the storage unit 53, and the content of this cyclic data is ignored. In addition, in the cyclic reception processing, if there is no data group, or the number of largest data groups is greater than one, processing related to a plurality of pieces of cyclic data received by the communication unit 50 is not executed, and the contents of these pieces of cyclic data are ignored. The pieces of cyclic data whose contents are ignored are neglected or erased, for example.

The cyclic reception processing that is executed by the control unit 54 of the ECU 3 is similar to the cyclic reception processing that is executed by the control unit 54 of the ECU 1. By respectively replacing the ECUs 1 and 2, the pieces of identification information B1 and C2, the frequency information N2, and the range information R1 in the cyclic reception processing that is executed by the control unit 54 of the ECU 1, with the ECUs 3 and 1, the pieces of identification information B3 and C1, the frequency information N1, and the range information R3, description of the cyclic reception processing that is executed by the control unit 54 of the ECU 3 can be achieved.

In transmission of cyclic data from the ECU 2 to the ECU 1, the ECUs 1 and 2 respectively apparatus function as a communication apparatus and a transmission apparatus. In transmission of cyclic data from the ECU 1 to the ECU 3, the ECUs 1 and 3 respectively function as a transmission apparatus and a communication apparatus.

Figure 10:
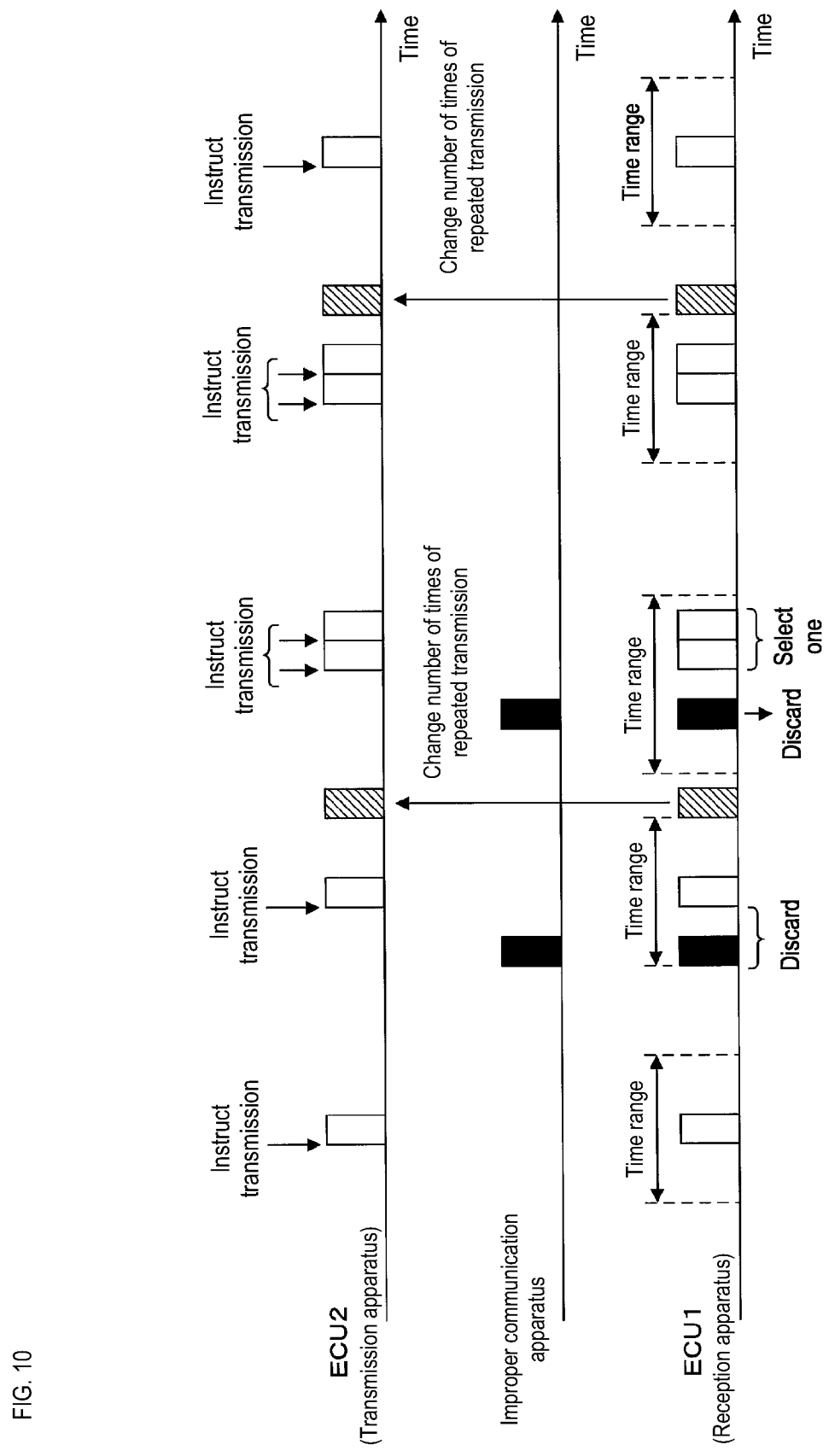
FIG. 10 is a diagram illustrating operations of the communication system.

FIG. 10 is a diagram illustrating operations of the communication system 100. Hereinafter, a communication apparatus that is improperly connected to the communication line 4 is referred to as an "improper communication apparatus", and the improper communication apparatus is assumed to transmit improper data that includes the identification information C2. FIG. 10 shows transmission and reception that are performed by the ECUs 1 and 2 and an improper communication apparatus. In FIG. 10, cyclic data transmitted by the communication unit 50 of the ECU 2 is indicated by a white rectangle, improper data transmitted by an improper communication apparatus is indicated by a black rectangle, and aperiodic data transmitted by the communication unit 50 of the ECU 1 is indicated by a hatched rectangle.

The cyclic data transmitted by the communication unit 50 of the ECU 2 includes the identification information C2, the aperiodic data transmitted by the communication unit 50 of the ECU 1 includes the identification information B1. Assume that the improper data transmitted by the improper communication apparatus also includes the identification information C2, and the content of the cyclic data transmitted by the communication unit 50 of the ECU 2 does not match the content of the improper data transmitted by the improper communication apparatus. As described above, the content of cyclic data consists of a plurality of bit values that constitute the cyclic data. The content of improper data consists of a plurality of bit values that constitute the improper data.

Note that, in FIG. 10, for ease of description, propagation times of cyclic data, improper data, and aperiodic data are not taken into consideration, and are regarded to be zero. Furthermore, it is assumed, in the ECU 2, when the control unit 54 instructs transmission, the communication unit 50 transmits cyclic data substantially at the same time.

In the ECU 2, the control unit 54 usually executes the cyclic transmission processing in the cycle T, and, in the cyclic transmission processing, the communication unit 50 transmits one piece of cyclic data. This cyclic data is received by the communication unit 50 of the ECU 1, and the time when the cyclic data is received is within the time range indicated by the range information R1.

In the ECU 1, if the time is past the end time of the time range indicated by the range information R1, when the number of pieces of cyclic data received by the communication unit 50 within the time range is one, the control unit 54 executes processing related to the cyclic data received by the communication unit 50 within the time range. The control unit 54 of the ECU 1 then changes the time range indicated by the range information R1 based on the cyclic data received by the communication unit 50. This time range is a time range for receiving cyclic data transmitted by the ECU 2 in the next cycle.

In the ECU 2, when the cycle T has elapsed since the previous cyclic transmission processing was started, the control unit 54 executes the cyclic transmission processing again, and instructs the communication unit 50 to transmit cyclic data in the cyclic transmission processing. The communication unit 50 of the ECU 1 receives this cyclic data within the changed time range indicated by the range information R1. Assume that the improper communication apparatus also transmitted one piece of improper data, and the communication unit 50 of the ECU 1 also received this improper data within the time range indicated by the range information R1. As described above, improper data also includes the identification information C2. Therefore, in the cyclic reception processing that is executed by the control unit 54 of the ECU 1, the improper data received by the communication unit 50 is handled as cyclic data.

Therefore, two pieces of cyclic data are received within the time range indicated by the range information R1. At this time, in the ECU 1, the control unit 54 compares the contents of the two pieces of cyclic data. Here, the contents of the two pieces of cyclic data do not match, and there is no data group having the same the content. Therefore, in the ECU 1, the control unit 54 causes the communication unit 50 to transmit aperiodic data indicating the number of times of repeated transmission, so as to change the number of times of repeated transmission indicated by the frequency information N2, in other words, the number of times of repeated transmission of the cyclic data that includes the identification information C2 from one to a number larger than or equal to two. In the example in FIG. 10, the number of times of repeated transmission is changed to two.

In the ECU 1, the two pieces of cyclic data received by the communication unit 50 within the time range indicated by the range information R1 include improper data, and thus the contents of these pieces of cyclic data are ignored. The control unit 54 of the ECU 1 changes the time range indicated by the range information R1 based on the time when the two pieces of cycle that includes improper data were received. Proper cyclic data is unknown, and thus the length of the time range is extended here.

Next, in the ECU 2, when the cycle T has elapsed since the previous cyclic transmission processing was started, the control unit 54 executes the cyclic transmission processing again, and repeatedly instructs the communication unit 50 to transmit cyclic data having the same content, and the communication unit 50 repeatedly transmits cyclic data. The communication unit 50 of the ECU 1 receives a plurality of pieces of cyclic data transmitted repeatedly by the communication unit 50 of the ECU 2 within the time range indicated by the range information R1. Assume that the improper communication apparatus transmitted one piece of improper data similarly to previous processing, and the communication unit 50 of the ECU 1 also received this improper data within the time range indicated by the range information R1. As described above, the improper data is handled as cyclic data.

Three pieces of cyclic data are received within the time range indicated by the range information R1. At this time, in the ECU 1, the control unit 54 compares the contents of the three pieces of cyclic data. Here, the contents of two pieces of cyclic data match, and the content of cyclic data, which is improper data, does not match the contents of the other two pieces of cyclic data. There is a data group having the same content, and the number of largest data groups with the largest number of pieces of data is one. Therefore, in the ECU 1, the control unit 54 selects a piece of data included in the largest data group, and executes processing related to the select data. In the ECU 1, the control unit 54 changes the time range indicated by the range information R1, based on the time when the cyclic data included in the largest data group was received. Since proper cyclic data could be selected, the time range is returned to its original length.

Next, in the ECU 2, when the cycle T has elapsed since the previous cyclic transmission processing was started, the control unit 54 executes the cyclic transmission processing again. In the ECU 2, the control unit 54 repeatedly instructs the communication unit 50 to transmit cyclic data having the same content similarly to the previous cyclic transmission processing, and the communication unit 50 repeatedly transmits two pieces of cyclic data. Assume that the improper communication apparatus stopped transmission of the improper data.

Two pieces of cyclic data are received by the communication unit 50 within the time range indicated by the range information R1. At this time, in the ECU 1, the control unit 54 compares the contents of the two pieces of cyclic data received by the communication unit 50. Here, in the ECU 1, the contents of all of the pieces of the cyclic data received by the communication unit 50 match, and thus the control unit 54 executes processing related to one piece of cyclic data received by the communication unit 50.

Furthermore, in the ECU 1, the control unit 54 causes the communication unit 50 to transmit aperiodic data indicating the number of times of repeated transmission so as to change the number of times of repeated transmission indicated by the frequency information N2, from greater than one to one. In this manner, when transmission of improper data stops, repeated transmission of the cyclic data that includes the identification information C2 stops, and thus, regarding the data that includes the identification information C2, the loads of processes performed by the ECUs 1 and 2 are small. In the ECU 1, the control unit 54 changes the time range indicated by the range information R1 based on the time when the communication unit 50 received the cyclic data.

Next, in the ECU 2, when the cycle T has elapsed since the previous cyclic transmission processing was started, the control unit 54 executes the cyclic transmission processing again, and the communication unit 50 transmits one piece of cyclic data. In the ECU 1, the control unit 54 executes processing related to the cyclic data received by the communication unit 50.

Note that, if K (K: an integer larger than or equal to two) pieces of cyclic data having the same content are transmitted by the communication unit 50 of the ECU 2 within the time range indicated by the range information R1, and K pieces of improper data having the same content are transmitted by the improper communication apparatus, the number of largest data groups is two. Therefore, in the ECU 1, the contents of (2·K) pieces of cyclic data received by the communication unit 50 are ignored, and the number of times of repeated transmission indicated by the frequency information N2 is changed to the number of pieces of data in the largest data group, in other words, a number larger than K. "·" represents multiplication.

As described above, in the ECU 1, if the communication unit 50 receives a plurality of pieces of cyclic data that include the identification information C2 within time range indicated by the range information R1, the control unit 54 compares the plurality of pieces of cyclic data received by the communication unit 50. As a result of the control unit 54 comparing the plurality of pieces of cyclic data, if there is no data group, or if the number of largest data groups is greater than one, the contents of the pieces of data received by the communication unit 50 are ignored.

At this time, in the ECU 2, the number of times of repeated transmission indicated by the frequency information N2 is changed from one to a number larger than or equal to two, or the number of times of repeated transmission indicated by the frequency information N2 is changed to a number larger than the number of pieces of data in the largest data group. If there is no data group, when the number of times of repeated transmission indicated by the frequency information N2 is changed from one to a number larger than or equal to two, the number of data groups changes from zero to one. At this time, the largest data group is constituted by a plurality of pieces of proper data transmitted by the communication unit 50 of the ECU 2.

If the number of largest data groups is greater than one, when the number of times of repeated transmission indicated by the frequency information N2 is changed to a number larger than the number of pieces of data in the largest data group, the number of largest data groups is changed to one. At this time, the largest data group is constituted by a plurality of pieces of proper data transmitted by the communication unit 50 of the ECU 2. As a result, the control unit 54 of the ECU 1 reliably selects proper cyclic data transmitted by the communication unit 50 of the ECU 2 from next reception of the cyclic data that includes the identification information C2, and repeatedly performs processing related to the proper cyclic data transmitted by the communication unit 50 of the ECU 2.

As described above, if the number of largest data groups is greater than one, the number of pieces of data of cyclic data that are repeatedly transmitted by the ECU 2 is changed to a number larger than the number of pieces of data in the largest data group. Therefore, if the number of pieces of improper data that are received by the communication unit 50 of the ECU 1 from the improper communication apparatus within the time range indicated by the range information R1 increases, and the number of largest data groups is changed to greater than one, the control unit 54 in the ECU 1 selects proper cyclic data transmitted by the communication unit 50 of the ECU 2.

As described above, the cyclic transmission processing and the aperiodic reception processing that are performed by the control unit 54 of the ECU 1 are similar to the cyclic transmission processing and the aperiodic reception processing that are performed by the control unit 54 of the ECU 2, and the cyclic reception processing that is executed by the control unit 54 of the ECU 3 is similar to the cyclic reception processing that is performed by the control unit 54 of the ECU 1. Therefore, transmission of cyclic data from the ECU 1 to the ECU 3 is performed in a manner similar to transmission of cyclic data from the ECU 2 to the ECU 1.

Note that the number of ECUs of the communication system 100 is not limited to three, and may also be two, or four or more. Furthermore, the communication protocol used in transmission and reception via the communication line 4 is not limited to the CAN protocol, and any communication protocol that can be applied to transmission and reception of data that includes identification information may also be used. Also, the communication line 4 is not limited to a twisted pair line.

The disclosed embodiment is to be considered as illustrative and non-limiting in all aspects. The scope of the present disclosure is indicated not by the above-stated meanings but by the scope of claims, and is intended to include all modifications that are within the meanings and the scope that are equivalent to those of the scope of claims.

The invention claimed is:

1. A communication apparatus that receives data that includes identification information, comprising:
   a comparison unit that compares a plurality of pieces of data that include the same identification information if they are received within a preset time range;
   a range change unit that changes the time range based on a time point at which data that includes the same identification information was received; and
   a selection unit that selects the data included in the largest data group if it is determined, as a result of the comparison unit comparing the plurality of pieces of data, that there are one or more data groups each consisting of data having the same content, and the number of largest data groups with the largest number of pieces of data among the one or more data groups is one,
   wherein, if it is determined, as a result of the comparison unit comparing the plurality of pieces of data, that there is no such data group or the number of largest data groups is greater than one, contents of the plurality of pieces of data are ignored.

2. The communication apparatus according to claim 1, wherein the same identification information is identification information included in periodically transmitted data.

3. The communication apparatus according to claim 1, wherein a content of data that includes the same identification information, and was received outside of the time range is also ignored.

4. A communication system comprising:
   the communication apparatus according to claim 1; and
   a transmission apparatus that transmits data that includes the same identification information to the communication apparatus,
   wherein the transmission apparatus includes a repeated transmission unit that repeatedly transmits data that includes the same identification information and has the same content, if it is determined, as a result of the comparison unit of the communication apparatus comparing the plurality of pieces of data, that there is no such data group.

5. The communication system according to claim 4, wherein the communication apparatus includes a data number change unit configured to, if it is determined, as a result of the comparison unit comparing the plurality of pieces of data, that the number of largest data groups is greater than one, change the number of pieces of data that are repeatedly transmitted by the transmission apparatus to a number larger than the number of pieces of data in the largest data group.

6. The communication system according to claim 4, wherein the transmission apparatus includes a stop unit configured to, if it is determined, as a result of the comparison unit of the communication apparatus comparing the plurality of pieces of data, that all of the plurality of pieces of data have the same content, stops repeated transmission of the data that includes the same identification information and has the same content.

7. A computer program that causes a computer to execute the steps of:
   comparing a plurality of pieces of data that include the same identification information if they are received within a preset time range;
   changing the preset time range based on a time point at which data that includes the same identification information was received; and
   selecting the data included in the largest data group, if it is determined, as a result of comparing the plurality of pieces of data, that there are one or more data groups each consisting of data having the same content, and the number of largest data groups with the largest number of pieces of data among the one or more data groups is one.

8. The communication apparatus according to claim 2, wherein a content of data that includes the same identification information, and was received outside of the time range is also ignored.

9. The communication apparatus according to claim 3, wherein a content of data that includes the same identification information, and was received outside of the time range is also ignored.

10. The communication system according to claim 5, wherein the transmission apparatus includes a stop unit configured to, if it is determined, as a result of the comparison unit of the communication apparatus comparing the plurality of pieces of data, that all of the plurality of pieces of data have the same content, stops repeated transmission of the data that includes the same identification information and has the same content.

* * * * *